(12) United States Patent
Otto

(10) Patent No.: US 10,046,914 B1
(45) Date of Patent: Aug. 14, 2018

(54) CHAIN LINK, CONVEYOR CHAIN AND CONVEYOR APPARATUS

(71) Applicant: Dematic Logistics GmbH, Bielefeld (DE)

(72) Inventor: Thomas Otto, Bielefeld (DE)

(73) Assignee: Dematic Logistics GmbH, Bielefeld (DE)

( * ) Notice: Subject to any disclaimer, the term of this patent is extended or adjusted under 35 U.S.C. 154(b) by 0 days.

(21) Appl. No.: 15/856,754

(22) Filed: Dec. 28, 2017

(30) Foreign Application Priority Data

Nov. 3, 2017 (DE) .................... 20 2017 106 670 U

(51) Int. Cl.
*B65G 17/38* (2006.01)
*B65G 17/20* (2006.01)

(52) U.S. Cl.
CPC ............. *B65G 17/38* (2013.01); *B65G 17/20* (2013.01)

(58) Field of Classification Search
CPC ................................ B65G 17/20; B65G 17/38
USPC ................................ 198/465.4, 678.1, 687.1
See application file for complete search history.

(56) References Cited

U.S. PATENT DOCUMENTS

| | | | | |
|---|---|---|---|---|
| 3,623,538 A | * | 11/1971 | Wakabayashi | ........ B61B 10/025 104/172.4 |
| 4,073,237 A | * | 2/1978 | Wakabayashi | ........ B61B 10/025 104/172.4 |
| 4,326,466 A | * | 4/1982 | Parry | ...................... B61C 13/06 104/172.4 |
| 4,389,944 A | * | 6/1983 | Linton | .................. B61B 10/025 104/172.4 |
| 5,433,154 A | * | 7/1995 | Chwalik | ................ B62D 65/18 104/130.04 |
| 5,690,032 A | * | 11/1997 | Koga | .................... B61B 10/025 104/172.1 |
| 5,819,906 A | * | 10/1998 | Enderlein | ............. B61B 10/025 198/687.1 |
| 6,007,064 A | * | 12/1999 | Cote | ...................... B65H 29/02 198/465.4 |
| 6,234,290 B1 | | 5/2001 | Drexl et al. | |
| 6,298,969 B1 | | 10/2001 | Otto | |

(Continued)

FOREIGN PATENT DOCUMENTS

DE 29709547 U1 8/1997
DE 20103664 U1 6/2001

(Continued)

*Primary Examiner* — Douglas A Hess
(74) *Attorney, Agent, or Firm* — Gardner, Linn, Burkhart & Ondersma, LLP

(57) ABSTRACT

A chain link of a conveyor chain of a conveyor apparatus for conveying objects suspended from holding adapters includes a base body and a push body arranged on an underside of the base body in a vertically elastic manner. The base body includes lateral friction roller press surfaces, coupling portions integrally formed on ends of the base body for pivotably connecting to a coupling portion of a base body of an adjacent link, and an integrally formed bearing for supporting running or guiding rollers. An underside of the push body includes a recess for receiving a coupling piece of a head part of a holding adapter. The push body has a holding arm with at least one section received in a vertically displaceable manner in a recess of the base body, and at least one spring element is fastened between the push body and the base body.

20 Claims, 5 Drawing Sheets

(56) References Cited

U.S. PATENT DOCUMENTS

| | | | |
|---|---|---|---|
| 6,367,612 B1 * | 4/2002 | Dosso | B61B 10/025 |
| | | | 104/172.1 |
| 6,382,396 B1 * | 5/2002 | Dana | B61B 10/025 |
| | | | 104/172.4 |
| 6,540,057 B2 | 4/2003 | Konrad et al. | |
| 6,540,058 B2 | 4/2003 | Drexl et al. | |
| 6,588,558 B2 | 7/2003 | Otto et al. | |
| 6,622,836 B2 | 9/2003 | Otto et al. | |
| 6,688,445 B2 | 2/2004 | Otto | |
| 7,255,220 B2 * | 8/2007 | Iwai | B65G 35/06 |
| | | | 104/172.1 |
| 8,490,774 B2 | 7/2013 | Janzen | |
| 8,561,787 B2 | 10/2013 | Wend et al. | |
| 8,607,963 B2 | 12/2013 | Wend et al. | |
| 8,672,118 B2 | 3/2014 | Janzen et al. | |
| 9,027,734 B2 | 5/2015 | Wend et al. | |
| 9,056,722 B2 | 6/2015 | Otto | |
| 9,205,990 B2 | 12/2015 | Otto | |
| 9,205,992 B2 | 12/2015 | Otto | |
| 9,296,561 B2 | 3/2016 | Wend et al. | |
| 9,440,791 B2 | 9/2016 | Wend | |
| 9,475,656 B2 | 10/2016 | Sieksmeier et al. | |
| 9,573,773 B2 | 2/2017 | Otto | |
| 9,850,071 B2 * | 12/2017 | Fenile | B65G 19/025 |
| 2017/0283172 A1 | 10/2017 | Otto | |
| 2017/0283173 A1 | 10/2017 | Otto | |

FOREIGN PATENT DOCUMENTS

| | | |
|---|---|---|
| DE | 10012524 A1 | 9/2001 |
| DE | 102004018569 A1 | 11/2005 |
| DE | 102005006067 A1 | 8/2006 |
| DE | 102006007936 A1 | 8/2007 |
| DE | 102010053426 B3 | 6/2012 |
| DE | 102013100132 A1 | 7/2014 |
| EP | 0336714 A2 | 10/1989 |
| EP | 0416337 A1 | 3/1993 |
| EP | 1258439 A1 | 11/2002 |
| EP | 1420106 A1 | 5/2004 |
| EP | 1690811 A1 | 8/2006 |
| EP | 2196415 B1 | 1/2013 |
| EP | 2818434 A1 | 12/2014 |
| EP | 2886494 A1 | 6/2015 |
| EP | 2910499 A1 | 8/2015 |
| EP | 2789555 B1 | 6/2016 |
| GB | 2243816 A | 11/1991 |
| JP | S6077011 A | 5/1985 |
| JP | H08151111 A | 6/1996 |
| WO | 0147791 A2 | 7/2001 |

* cited by examiner

CHAIN LINK, CONVEYOR CHAIN AND CONVEYOR APPARATUS

CROSS REFERENCE TO RELATED APPLICATION

The present application claims priority of German Utility Model application Ser. No. 20 2017 106 670.3 filed Nov. 3, 2017.

BACKGROUND AND FIELD OF THE INVENTION

The present invention relates to a chain link of a conveyor chain of a conveyor apparatus for conveying objects suspended from holding adapters, and to a conveyor chain and a conveyor apparatus.

A generic chain link of a conveyor chain of a conveyor apparatus is known e.g. from DE 10 2013 100 132 A1. Such conveyor apparatuses are also referred to as power and free conveyors. The chain links of such a conveyor chain are pivotably connected to one another. Integrally formed on the underside a base body of the chain link is a respective push body which is referred to as a lamella and is connected to the respective base body via elastic webs which are integrally formed between the push body and the base body. By means of the elastic webs, the push body can be urged relative to the base body in a vertically elastic manner upwards against the base body in order thereby to permit the accumulation of holding adapters, which are conveyed with the aid of the push bodies, and objects suspended from said holding adapters at predetermined locations on the conveyor apparatus, without stopping the conveyor chain.

In order to stop an object suspended from the holding adapter, the conveyor chain is not stopped and instead the holding adapter is stopped with the aid of a stopping device and is decoupled from the conveyor chain, wherein the conveyor chain continues to move.

SUMMARY OF THE INVENTION

The present invention provides a chain link and a conveyor chain and a conveyor apparatus having such chain links, which allows the holding adapters to be conveyed in a reliable manner and allows the chain links or the chain to be maintained in a simplified manner.

A chain link in accordance with an aspect of the present invention has a base body and a push body which is arranged on an underside of the base body so as to be connected in a vertically elastic manner to the base body. The base body has lateral friction roller press surfaces, against which friction rollers can be pressed for driving the conveyor chain. Coupling portions which are used for pivotably connecting to a coupling portion of a base body of an adjacent chain link are integrally formed on ends of the base body which are spaced apart from one another in the conveyance direction. Extending from the upper side of the base body is an integrally formed bearing for supporting running or guiding rollers which run or are guided in a guide rail of the conveyor apparatus. Provided on an underside of the push body is at least one recess for receiving a coupling piece of a head part of a holding adapter for holding an object to be conveyed. The push body has at least one holding arm, from which at least one section is received in a vertically displaceable manner in a recess of the base body, and at least one spring element is fastened between the push body and the base body.

In the case of a damaged or defective component of the chain link, e.g. the push body, the multi-part design of the chain link with a separate base body, push body and spring element renders it possible in a simple manner to replace said component, without the chain link having to be separated from the conveyor chain. By fastening a spring element, which is provided as a separate component, between the push body and the base body, it is possible with the chain link in accordance with an embodiment of the present invention to manufacture the spring element from a correspondingly suitable material, e.g. in the form of a metal spring, depending upon the requirement of the spring force to be supplied and/or the long-term durability.

In accordance with additional aspects of the invention a further embodiment variants may be provided. For example, the recess may be formed as a hollow space, which ensures that the holding arm is guided in a reliable manner in the base body. Still further, a plurality of, in particular two, spring elements may be fastened between the push body and the base body. This allows a uniform distribution of force between the push body and the base body.

In accordance with a further embodiment variant, in order to limit the relative movement between the base body and the push body the section of the holding arm received in the recess is provided with a latching lug which engages behind a latching step integrally formed in the recess. Such a latching step in the recess can be integrally formed in a simple manner on the base body of the chain link and provides a counter bearing for the spring element so that this can be clamped with slight pretensioning between the base body and the push body. Still further, the at least one latching lug may be integrally formed on the free end of the holding arm.

According to a further embodiment variant, at least one section of the holding arm is formed so as to taper conically in the direction towards its free end. Accordingly, in which case the recess may be formed so as to taper conically at least partially from an underside of the base body in the direction towards the upper side of the base body. This ensures that the holding arm is guided in a reliable manner in the recess when the push body is pressed against the base body.

In order to prevent the push body from being inserted into the base body in an incorrect orientation, at least one stop protrudes from a peripheral surface of the section of the holding arm received in the recess, said stop protruding into a widened portion of the recess which defines a direction of insertion of the push body into the base body. This ensures that the mutually engaging push bodies are always inserted in the correct orientation into the push bodies and thus ensure a correct overlap of the correspondingly adapted ends of the push bodies for the purpose of coupling the push bodies to one another. The stop is preferably also used for preventing excessive compression of the spring element, wherein, during displacement of the holding arm in the recess to an upper end position, the stop strikes against an inner wall of the recess.

According to a further embodiment variant, in order to fix the at least one spring element between the base body and the push body at least one holding element is arranged, in particular integrally formed, on the upper side of the push body and/or the underside of the base body. The at least one spring element may be held in a frictionally engaged manner on the holding element or the holding elements. For instance, in the case of a spring element formed as a helical spring the holding element is preferably formed as a cylinder stub. The spring element is formed preferably as a helical spring manufactured from a metal. It is also feasible to design the spring element as a block which is manufactured from an elastic synthetic material and lies between the push body and the base body in a border which corresponds to the support surface of the block on the push body or on the base body and protrudes from the upper side of the push body or the underside of the base body. The push body itself may be manufactured from a synthetic material provided with lubricant and thus permits a high level of abrasion resistance.

The conveyor chain of a conveyor apparatus for conveying objects suspended from holding adapters and comprising a plurality of chain links pivotably connected to one another is formed by chain links as described above. Accordingly, a conveyor apparatus for conveying suspended objects and comprising a rail profile, a conveyor chain which can be moved in the rail profile in a conveyance direction and consists of a plurality of chain links, holding adapters for holding in each case an object to be conveyed, is formed by chain links as described above.

The conveyor chain of the present invention assists in preventing the issues of the synthetic material spring elements integrally formed between the base body and the push body of chain links manufactured substantially in one piece losing their effective spring force over time when continuously loaded, which makes it more difficult to entrain the holding adapters. Moreover, the conveyor chain of the present invention also aids in avoiding the disadvantage of having to replace the entire chain link when a part of such a substantially one piece chain link is damaged, in which case the entire chain link must otherwise always be replaced, thus decreasing the assembly outlay.

Preferred embodiment variants will be described hereinafter with the aid of the accompanying drawings.

DESCRIPTION OF THE PREFERRED EMBODIMENTS

In the following description of the figures, terms such as at the top, at the bottom, on the left, on the right, at the front, at the rear etc. relate exclusively to the exemplified illustration and position of the chain links, base bodies, push bodies, holding arm, recess, coupling piece and the like selected in the respective figures. These terms are not to be understood to be limiting, i.e. these references can change by reason of different operating positions or the mirror-symmetrical design or the like.

Figure 1:
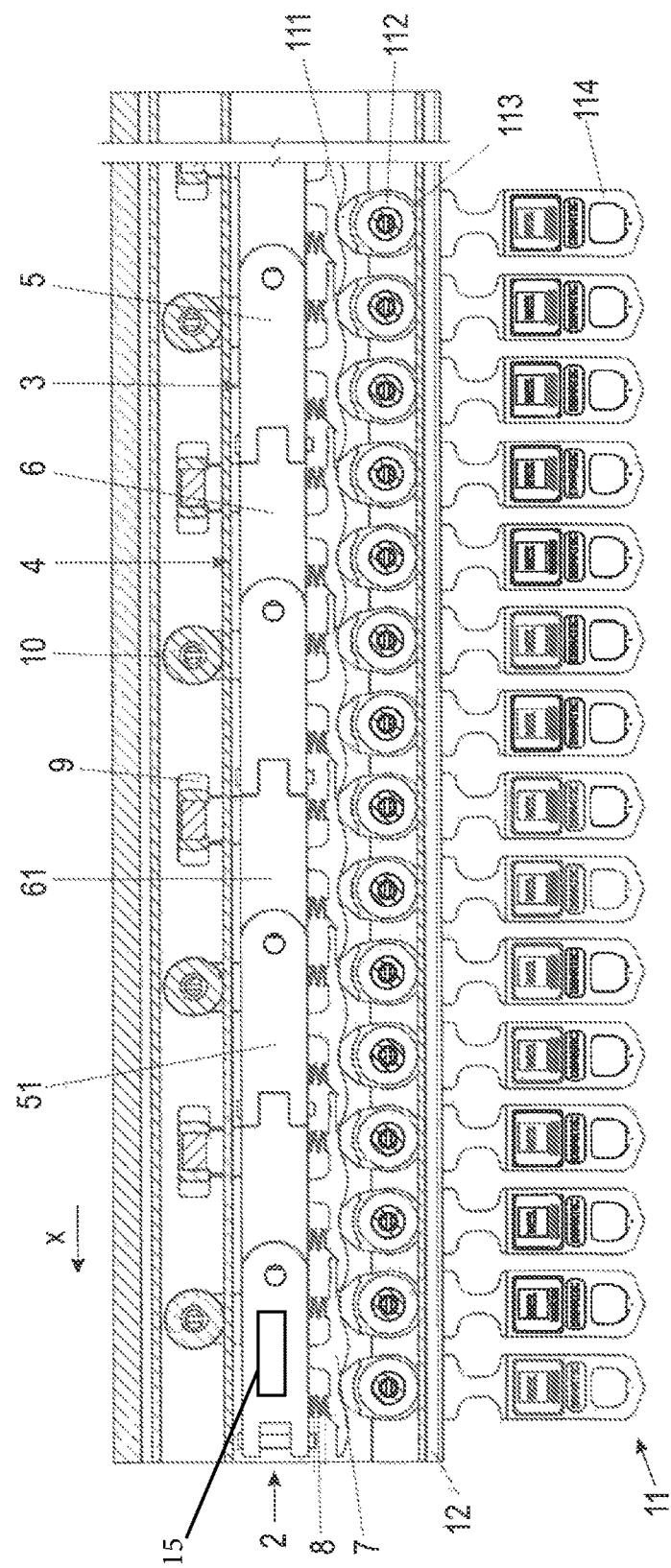
FIG. 1 shows a schematic side view of a section of a conveyor apparatus illustrating chain links of a conveyor chain and holding adapters connected thereto.

In FIG. 1, the reference sign 2 designates a conveyor chain 2 of a conveyor apparatus for conveying objects suspended from holding adapters 11. The conveyor chain 2 is received in a rail profile 12.

In the case of the exemplified embodiment of the conveyor chain 2 shown in this case, in order to move the conveyor chain 2 in a movement direction x a guide wheel 9 which rotates about a vertical axis is fastened to a first chain link 3 and a running wheel 10 which rotates about a horizontal axis is fastened to a second chain link 4.

The conveyor chain 2 consists of a multiplicity of chain links 3, 4 which are connected in an articulated manner to one another.

Figure 2:
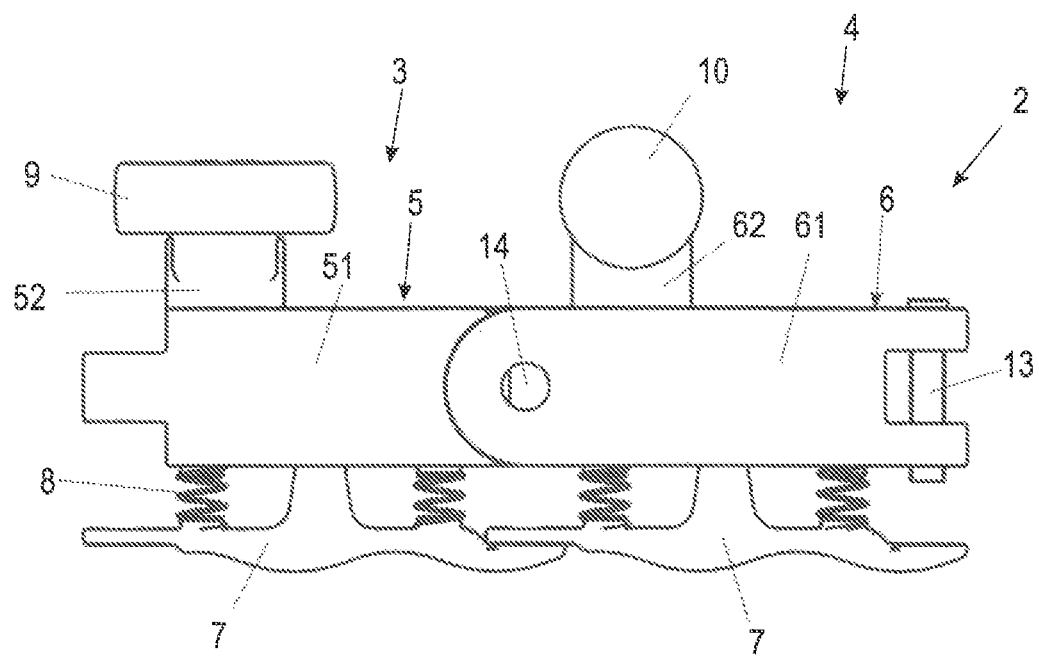
FIG. 2 shows a schematic side view of two mutually coupled chain links.
Figure 3:
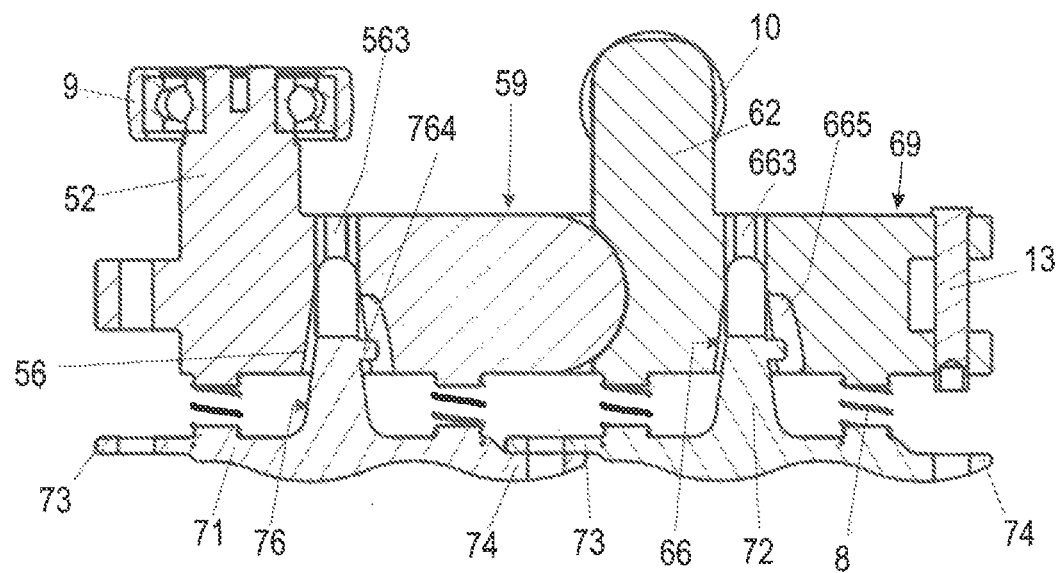
FIG. 3 shows a sectional view of the pair of chain links shown in FIG. 2 for illustrating the connection of the push bodies into the base bodies of the respective chain link.

As also illustrated in FIGS. 2 and 3, each of the chain links 3, 4 has a base body 5, 6 and a push body 7 which is arranged on an underside 58, 68 of the base body 5, 6 so as to be connected in a vertically elastic manner to the base body 5, 6.

In order to support the guiding roller 9 or the running roller 10, a bearing arm 52, 62 extends in each case from the respective base body 5, 6 from the upper side 69, 59 of the base body 5, 6, said bearing arm having in each case a bearing 55, 65 integrally formed thereon which is used for supporting the guiding roller 9, which rotates about a vertical axis, or the running roller 10 which can be rotated about a horizontal axis extending perpendicularly to the conveyance direction x.

An underside 72 of the push body 7 is provided with at least one recess 75 which is used for receiving a coupling piece 111 of a head part 113 of a holding adapter 11 for holding an object to be conveyed.

In the embodiment variant shown in this case, the holding adapters 11 have a receiving frame 114, in which e.g. a bracket can be suspended, which is conveyed with the aid of the conveyor chain 2 in the conveyance direction x. The base body 5, 6 include friction roller press surfaces 51, 61 against which friction rollers 15 press for driving the conveyor chain 2.

Integrally formed above the receiving frame 14 is a head part 113, to which a running roller 112 is fastened so as to be rotatable about a horizontal axis of rotation. The running roller 112 is likewise received in the rail profile 6 in a running track provided for this purpose. The upper end of the head part 113 facing the conveyor chain 2 is designed as a coupling piece 111 which is received preferably in a frictionally engaged manner in the recess 75 of the push body 7.

If one of the holding adapters 11 is stopped at a predetermined position of the conveyor apparatus owing to an accumulation, the coupling piece 111 of the head part 113 can slide out of the recess 75 of the push body 7 and thus separate the conveyor connection between the holding adapter 11 and the respective chain link 3, 4 of the conveyor chain 2. The separation is effected by virtue of the fact that the push body 7 is urged upwards by the depth of the recess 75 in the direction of the base body 5, 6 of the respective chain link 3, 4, which is made possible by the vertical elastic coupling of the push body 7 to the base body 5, 6.

In order to be able to move the conveyor chain 2 through curve regions of the rail profile 12, coupling portions 53, 54, 63, 64 which are integrally formed on ends of the base body 5, 6 spaced apart from one another in the conveyance direction x are integrally formed and are used for pivotably connecting to a coupling portion 53, 54, 63, 64 of a base body 5, 6 of an adjacent chain link 3, 4.

In order to pivot adjacent chain links 3, 4 with respect to one another in a horizontal plane, the mutually adjacent coupling portions 54, 64 are designed so as to be able to be pushed one inside the other and are coupled to one another via a connecting bolt 13 which extends through respective bores 641, 541 extending vertically through the coupling portions 54, 64 and couples these.

In order to pivot adjacent chain links 3, 4 about a horizontal axis of rotation, the coupling portions 53, 63 are formed on the respective opposite coupling portion of each of the chain links 3, 4 such that they overlap one another in a vertical plane and are connected to one another by means of a connecting bolt which extends through respective bores 531, 631 extending horizontally through the coupling portions 53, 63 and couples these.

In order to couple the push body 7 in a spring-elastic manner to the respective chain link 3, 4, the push body 7 has at least one holding arm 76, of which at least one section is received in a vertically displaceable manner in a recess 56, 66 of the base body 5, 6.

At least one spring element 8 is fastened between the push body 7 and the base body 5, 6. In the embodiment variant shown in this case, the spring element 8 is formed as a helical spring manufactured from a metal, in particular a helical compression spring. However, other embodiments of such a spring element 8 are also feasible, e.g. in the form of a spring-elastic block which is fastened, in particular releasably fastened, between the push body 7 and base body 5, 6.

Figure 4:
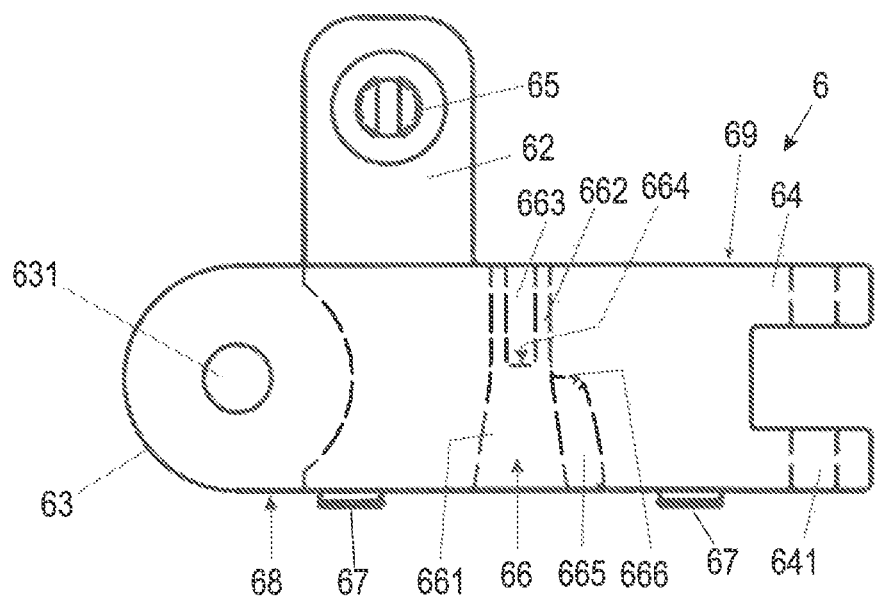
FIGS. 4 and 5 show side views of the two base bodies of the chain links shown in FIG. 2.
Figure 5:
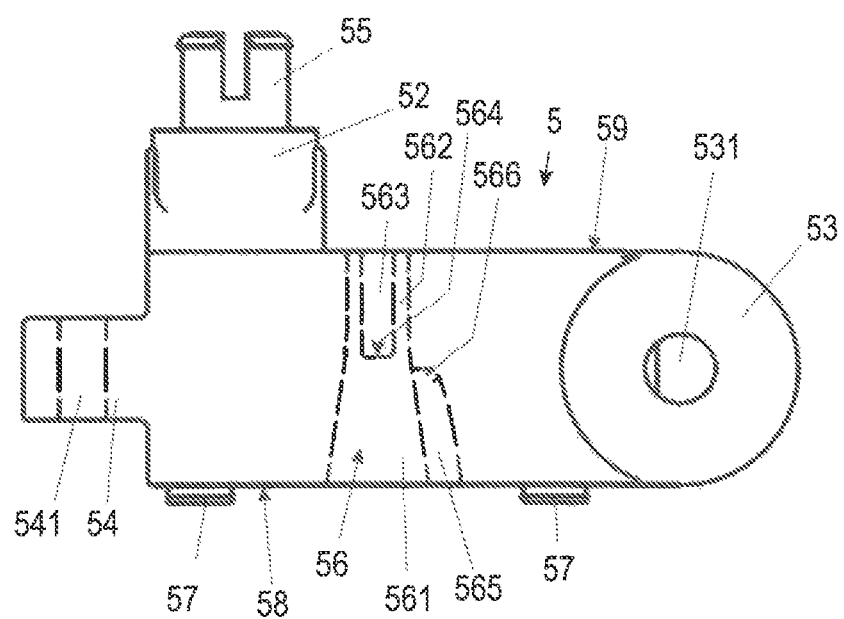

As shown in FIGS. 3 to 5, the recess 56, 66 of the base body 5, 6 is formed as a hollow space which, in the embodiment variant shown in this case, is provided approximately centrally in the base body 5, 6 extending in the longitudinal direction of the conveyor chain 2.

As shown in FIGS. 3 to 5, the recess 56, 66 is formed so as to taper conically at least partially from an underside 58, 68 of the base body 5, 6 in the direction towards the upper side 59, 69 of the base body 5, 6.

Figure 6:
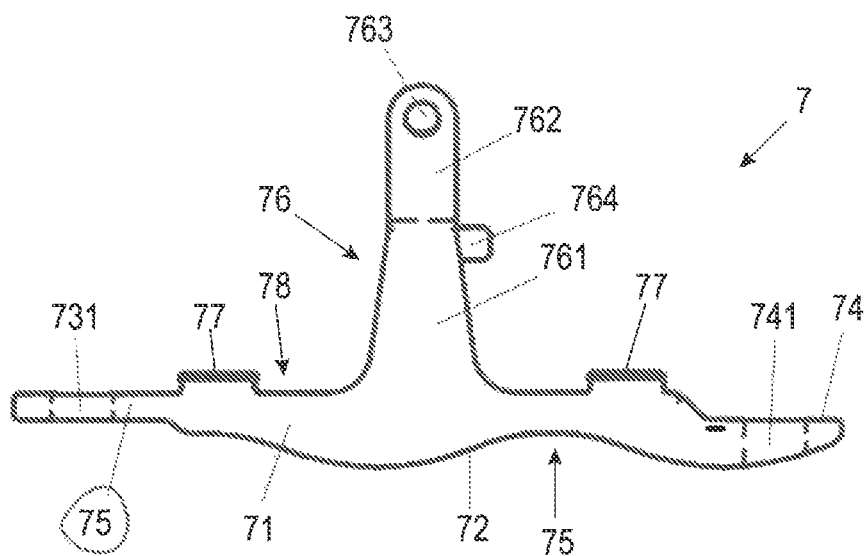
FIG. 6 shows a side view of a push body.
Figure 7:
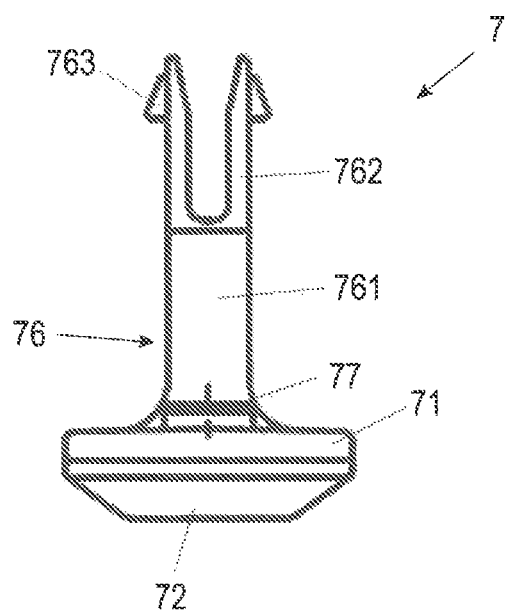
FIG. 7 shows a view from the front of the push body shown in FIG. 6.
Figure 8:
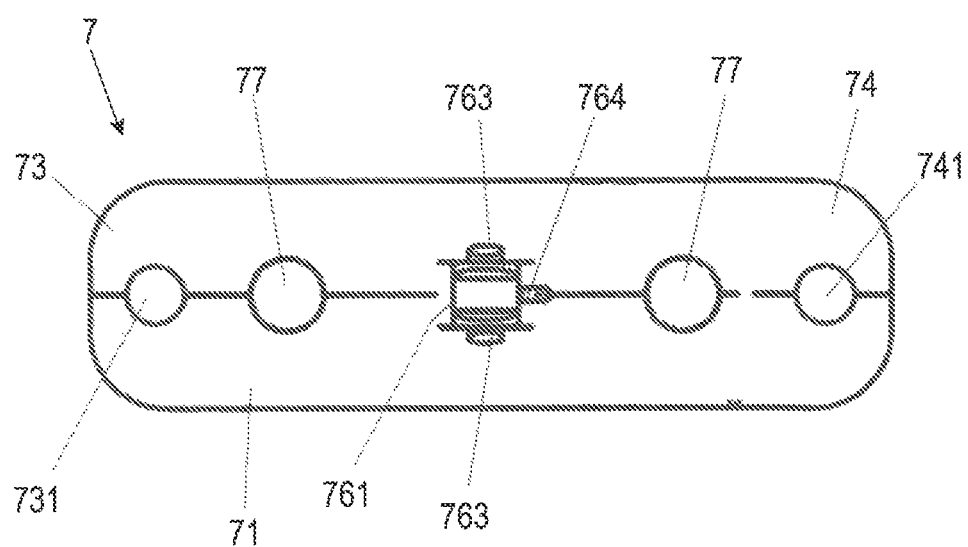
FIG. 8 shows a plan view from above of the push body shown in FIG. 6.

Accordingly, as illustrated in FIGS. 3 and 6, the holding arm 76 is also formed so as to taper conically in the direction towards its free end. The foot of the holding arm 76 which is wide relative to its free end and ends in an abutment web 71 of the push body 7 ensures the dimensional stability of the push body 7. Furthermore, the upwardly conically tapering portion 661, 561 of the recess 56, 66 has the advantage that jamming of the holding arm 76 in the recess 56, 66 is avoided.

In order to define a maximum spacing between the abutment web 71 of the push body 7 and the underside of the base body 5, 6, the section of the holding arm 76 received in the recess 56, 66 and intended to limit the relative movement between the base body 5, 6 and the push body 7 has at least one latching lug 763 which engages behind a latching step 564, 664 integrally formed in the recess 56, 66. The push body 7 includes bores 731, 741, as well as a free end 762 adjacent section 761.

In the exemplified embodiment shown, the free end of the holding arm 76 of the push body 7 has two such latching lugs 763 integrally formed thereon which can be displaced in corresponding channels 563, 663 comprising transverse recesses as part of the recesses 56, 66 and which, by means of the channel end designed as a latching step 564, 664, limit the movement of the abutment web 71 away from the base body 5, 6. In the embodiment variant shown in this case, the latching lugs 763 are oriented perpendicularly to the movement direction x of the conveyor chain 2. Also provided are longitudinal recesses 562, 662.

As shown in FIGS. 3 to 6, in order to prevent excessive compression of the spring elements 8 at least one stop 764 protrudes from a peripheral surface of the section of the holding arm 76 received in the recess 56, 66 for the purpose of limiting the relative movement between the base body 5, 6 and the push body 7, said stop striking against an inner wall 566, 666 of the recess 56, 66 when the holding arm 76 in the recess 56, 66 is displaced to an upper end position.

In order to guide this stop 764, the conically tapering part 661, 561 of the recesses 56, 66 is widened in the direction of the protruding stop 764 by a widened portion 665. This widened portion 565, 665 is preferably formed as a guide groove for receiving the stop 764 and is used primarily for correctly orienting the push bodies 7 upon insertion into the base bodies 5, 6.

When the push bodies 7 are held in the correct orientation in the base bodies 5, 6, a front overlapping portion 73 of a first push body 7 which is integrally formed on a first end of the abutment web 71 overlaps with a rear overlapping portion 74 of a second push body 7 which is arranged upstream thereof in the movement direction x and is integrally formed on the other end of the abutment web 71, so that the push bodies 7 are coupled to one another in this way.

In the embodiment variants shown in this case, in order to releasably fix the spring elements 8 to the base body 5, 6 and the push body 7 holding elements 57, 67, 77 for fixing the spring elements 8 are arranged, in particular integrally formed, on the upper side 78 of the push body 7 and on the underside 58, 68 of the base body 5, 6.

When the spring elements 8 are designed as helical springs, the holding elements 57, 67, 77 are preferably designed as cylindrical stubs. However, depending upon the formation of the spring elements 8 other configurations of these holding elements 57, 67, 77 are also feasible. Each of the spring elements 8 is held preferably in a frictionally engaged manner on the holding element 57, 67, 77.

The spring elements 8 formed in this case as helical springs are clamped with pretensioning between holding elements 57, 67, 77, arranged opposite one another, on the underside of the base body 5, 6 and the upper side 78 of the push body 7 and are pulled with edge-side windings in a frictionally engaged manner onto the holding element 57, 67, 77 formed as a cylinder stub.

The push body 7 is manufactured preferably from a synthetic material provided with a lubricant.

In the embodiment variant shown in this case, the underside of the push body 7 is undulated in each case having a recess 75 for receiving a coupling piece 111 of a holding adapter 11.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A chain link of a conveyor chain of a conveyor apparatus for conveying objects suspended from holding adapters comprising:
   a base body; and
   a push body which is arranged on an underside of the base body so as to be connected in a vertically elastic manner to the base body;
   wherein the base body comprises lateral friction roller press surfaces, against which friction rollers can be pressed for driving the conveyor chain, coupling portions which are integrally formed on ends of the base body spaced apart from one another in a conveyance direction for pivotably connecting to a coupling portion of a base body of an adjacent chain link, and an integrally formed bearing which extends from an upper side of the base body for supporting running or guiding rollers;

wherein provided on an underside of the push body is at least one recess for receiving a coupling piece of a head part of a holding adapter for holding an object to be conveyed, and wherein the push body has at least one holding arm, of which at least one section is received in a vertically displaceable manner in a recess of the base body, and wherein at least one spring element is fastened between the push body and the base body.

2. The chain link as claimed in claim 1, wherein the recess is formed as a hollow space.

3. The chain link as claimed in claim 2, wherein the section of the holding arm received in the recess and intended to limit the relative movement between the base body and the push body has at least one latching lug which engages behind a latching step integrally formed in the recess.

4. The chain link as claimed in claim 3, wherein the at least one latching lug is integrally formed on the free end of the holding arm.

5. The chain link as claimed in claim 2, wherein two spring elements are fastened between the push body and the base body.

6. The chain link as claimed in claim 5, wherein the section of the holding arm received in the recess and intended to limit the relative movement between the base body and the push body has at least one latching lug which engages behind a latching step integrally formed in the recess.

7. The chain link as claimed in claim 6, wherein the at least one latching lug is integrally formed on the free end of the holding arm.

8. The chain link as claimed in claim 7, wherein at least one section of the holding arm is formed so as to taper conically in the direction towards its free end, and wherein the recess is formed so as to taper conically at least partially from an underside of the base body in the direction towards the upper side of the base body.

9. The chain link as claimed in claim 1, wherein a plurality of spring elements are fastened between the push body and the base body.

10. The chain link as claimed in claim 1, wherein at least one section of the holding arm is formed so as to taper conically in the direction towards its free end.

11. The chain link as claimed in claim 10, wherein the recess is formed so as to taper conically at least partially from an underside of the base body in the direction towards the upper side of the base body.

12. The chain link as claimed in claim 1, wherein at least one stop protrudes from a peripheral surface of the section of the holding arm received in the recess, said stop protruding into a widened portion of the recess which defines a direction of insertion of the push body into the base body.

13. The chain link as claimed in claim 12, wherein, during displacement of the holding arm in the recess to an upper end position, the stop strikes against an inner wall of the recess.

14. The chain link as claimed in claim 1, wherein at least one holding element for fixing the at least one spring element 8 is arranged on the upper side of the push body and/or the underside of the base body.

15. The chain link as claimed in claim 14, wherein the at least one spring element is held in a frictionally engaged manner on the holding element or the holding elements.

16. The chain link as claimed in claim 1, wherein the spring element is formed as a helical spring manufactured from a metal.

17. The chain link as claimed in claim 1, wherein the spring element is formed as a block which is manufactured from an elastic synthetic material.

18. The chain link as claimed in claim 1, wherein the push body is manufactured from a synthetic material provided with lubricants.

19. A conveyor chain of a conveyor apparatus for conveying objects suspended from holding adapters, comprising a plurality of chain links of claim 1 that are pivotably connected to one another.

20. A conveyor apparatus for conveying suspended objects, said conveyor apparatus comprising:
   a conveyor chain comprising a plurality of chain links of claim 1;
   a rail profile within which said conveyor chain can be moved in a conveyance direction;
   holding adapters for holding in each case an object to be conveyed;
   friction rollers configured to press against the lateral friction roller press surfaces of the base body of each chain link for driving the conveyor chain;
   wherein the holding adapters each have a head part which is mounted so as to be able to roll in the rail profile and can be coupled to one of the push elements in each case.

* * * * *